No. 780,983. PATENTED JAN. 31, 1905.
C. W. FAITOUTE.
VEHICLE TIRE.
APPLICATION FILED JUNE 15, 1904.
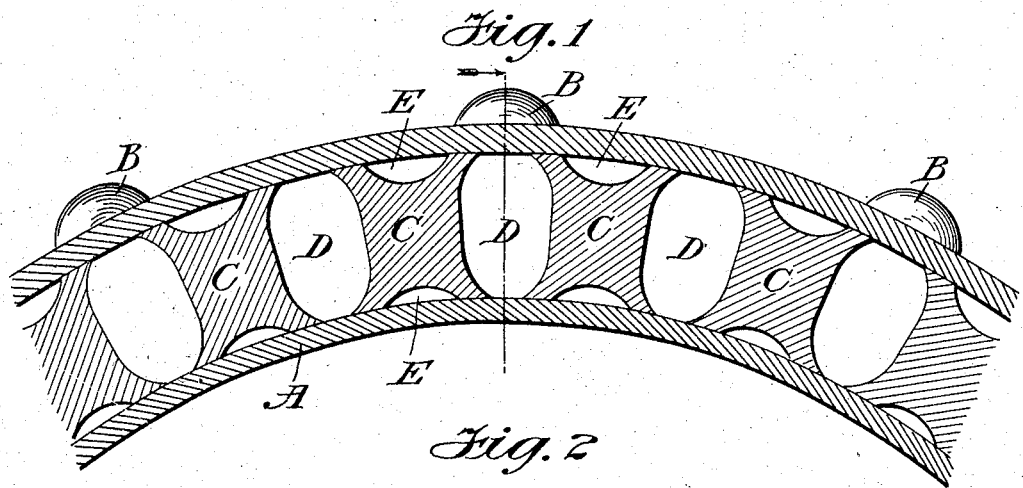
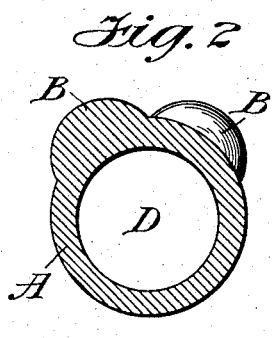
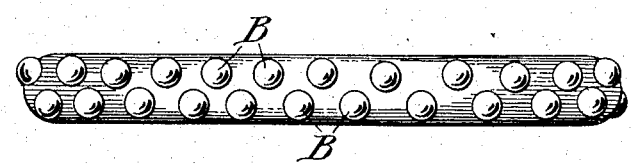
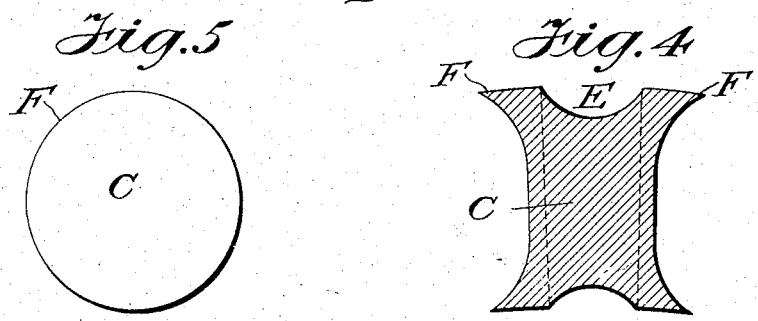
Witnesses
Chas. F. Clagett
Chas. L. Wolf
Inventor
Charles W. Faitoute
By his Attorney
Charles A. Stephens No. 780,983. Patented January 31, 1905.

UNITED STATES PATENT OFFICE.

CHARLES W. FAITOUTE, OF SUMMIT, NEW JERSEY.

VEHICLE-TIRE.

SPECIFICATION forming part of Letters Patent No. 780,983, dated January 31, 1905.

Application filed June 15, 1904. Serial No. 212,621.

*To all whom it may concern:*

Be it known that I, CHARLES W. FAITOUTE, a citizen of the United States, and a resident of Summit, in the county of Union and State of New Jersey, have invented certain new and useful Improvements in Vehicle-Tires, of which the following is a specification.

This invention relates to vehicle-tires, and has for its object the providing of a tire which shall possess all the advantages of a pneumatic or air-cushion tire and at the same time obviate the liability of disastrous results due to puncture, &c. By providing a tire composed of an outer flexible tubular casing of an improved construction which shall be more fully set out hereinafter and a series of yielding cushion-supports arranged around the inside of this casing at frequent intervals, with a space between each of said supports, the outer portion or tread of the tire is supported in the form of a yielding bridge, and as all the parts are of a flexible material the result is a tire which yields readily to inequalities in the road, &c., is durable, and not easily damaged or destroyed by use.

Referring now to the drawings accompanying this specification, Figure 1 is a sectional side elevation of a portion of a vehicle-tire embodying my invention. Fig. 2 is a cross-sectional view of the same. Fig. 3 is a plan view showing a preferred arrangement of projecting bosses from the outer surface or tread of the tire. Fig. 4 is an enlarged detail side elevation view of one of the supporting members. Fig. 5 is an end elevation view of Fig. 4.

Similar reference characters are employed to designate corresponding parts in the several figures wherein they occur.

An outer tubular casing is shown at A, which is preferably of a flexible material, such as rubber, and provided with projecting bosses (shown at B) from the outer surface or tread thereof. These bosses may be offset on alternate sides of the center line of the tire, as shown in Fig. 3, which will insure a more even distribution of the weight, which will be carried by two or more of these bosses at the same time as the tire is compressed under a load. On the inside of this tubular casing is provided a series of yielding supports. (Shown at C and also in detail in Figs. 4 and 5.) These supports conform to the shape of the opening on the inside of the outer covering and are placed intermediary of the projecting bosses on the tire-surface, so as to leave an open space D under each of the aforesaid bosses and between adjacent supports. The projecting bosses localize the weight or pressure over these open spaces and together with the supports form a yielding bridge which allows the tire to be easily compressed at these points. To provide additional flexibility and also to allow of the portions of the tread between the bosses to be compressed should any obstruction of unusual height be passed over by the tire, a depression in the supporting-surface of the member C is provided at E, as shown. This may be an annular depression running around the entire supporting-surface of the member C, as shown in Figs. 4 and 5. Projecting lips, such as F, are formed on the supporting member C and which extend under the bosses, and so relieve the outer casing of any undue strain such as might be caused by a straight-sided support and also insures a more perfect distribution of the load over the supporting-bridge.

In order to insure the best results, it is necessary that all parts of this tire should be made of material which is yielding and flexible. It has been found by experience that rubber is best suited for the purpose both for the tubular casing and for the interior supporting members. The degree of flexibility of the supports, as well as the thickness of the outer casing, the number and arrangement of the projecting bosses, &c., may be varied to meet the requirements of the several uses to which tires of this class are put.

It will be understood that I do not confine myself to the specific material or exact construction shown and described, as these may be varied as required without departing from the scope of my invention.

Having now described my invention, what I claim as new, and desire to secure by Letters Patent, is—

1. In a vehicle-tire, the combination of a flexible tubular casing with a plurality of projecting bosses from the outer surface or tread thereof, a series of yielding supporting members so located on the inside of said casing as to form alternate supports for the same, substantially as described.

2. In a vehicle-tire, the combination of a flexible tubular casing with a plurality of bosses offset on alternate sides of the center line of the outer surface or tread, a series of yielding supporting members so located on the inside of said casing as to form alternate supports for the same, substantially as described.

3. In a vehicle-tire, the combination of a flexible tubular casing with a plurality of projecting bosses from the outer surface or tread thereof, a series of yielding supporting members located on the inside and intermediary of the projecting bosses on the outer surface of said casing, forming supports for the same, substantially as described.

4. In a vehicle-tire, the combination of a flexible tubular casing with a plurality of projecting bosses from the outer surface or tread thereof, a series of yielding supporting members located on the inside and intermediary of the projecting bosses on the outer surface of said casing and having projecting lips extending under said bosses, forming alternate supports for the same, substantially as described.

5. In a vehicle-tire, the combination of a flexible tubular casing with a plurality of projecting bosses from the outer surface or tread thereof, a series of yielding supporting members located on the inside and intermediary of the projecting bosses on the outer surface of said casing, having a depression in the supporting-surface under that portion of the tread between the bosses and having projecting lips extending under said bosses forming alternate supports for the same, substantially as described.

6. In a vehicle-tire, the combination of a flexible tubular casing, a series of cushion-supports so located on the inside of said casing as to form a bridge for supporting the outer surface or tread, projecting bosses localizing the weight or pressure over the space between said cushion-supports, substantially as described.

Signed at New York, in the county of New York and State of New York, this 1st day of June, A. D. 1904.

CHARLES W. FAITOUTE.

Witnesses:
CHAS. L. WOLF,
M. BENDER.